(12) United States Patent
Okamura et al.

(10) Patent No.: US 11,939,930 B2
(45) Date of Patent: Mar. 26, 2024

(54) VEHICLE CONTROLLER AND METHOD FOR VEHICLE CONTROL METHOD

(71) Applicant: TOYOTA JIDOSHA KABUSHIKI KAISHA, Toyota (JP)

(72) Inventors: Koji Okamura, Aichi-ken (JP); Kazuki Tsuruoka, Nagoya (JP); Hitoshi Matsunaga, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/310,082

(22) Filed: May 1, 2023

(65) Prior Publication Data

US 2023/0366360 A1   Nov. 16, 2023

(30) Foreign Application Priority Data

May 13, 2022 (JP) .................................. 2022-079352

(51) Int. Cl.
*F02D 41/02* (2006.01)
*F02D 13/02* (2006.01)
*F02D 41/00* (2006.01)

(52) U.S. Cl.
CPC ....... *F02D 41/023* (2013.01); *F02D 13/0234* (2013.01); *F02D 41/0002* (2013.01); *F02D 2041/001* (2013.01)

(58) Field of Classification Search
CPC ............... F02D 41/023; F02D 13/0234; F02D 41/0002; F02D 2041/001
See application file for complete search history.

(56) References Cited

U.S. PATENT DOCUMENTS

| 5,184,577 A | * | 2/1993 | Kato | .................. | F02D 41/0002 |
| | | | | | 477/109 |
| 5,553,573 A | * | 9/1996 | Hara | .................. | F02D 13/0261 |
| | | | | | 123/90.31 |
| 2010/0175644 A1 | * | 7/2010 | Shinagawa | ......... | F02D 13/0234 |
| | | | | | 123/90.15 |
| 2010/0288236 A1 | * | 11/2010 | Ashizawa | ............... | F02B 23/10 |
| | | | | | 123/478 |
| 2011/0214632 A1 | * | 9/2011 | Pattakos | .................. | F01L 9/14 |
| | | | | | 123/90.12 |
| 2018/0010486 A1 | * | 1/2018 | Yoshihara | ........... | F02D 13/0261 |
| 2020/0072135 A1 | * | 3/2020 | Hotta | .................... | F01L 1/3442 |

FOREIGN PATENT DOCUMENTS

| JP | 2008-115755 A | 5/2008 |
| JP | 2016-114042 A | 6/2016 |
| JP | 2019-124224 A | 7/2019 |

* cited by examiner

*Primary Examiner* — Carl C Staubach
(74) *Attorney, Agent, or Firm* — Oblon, McClelland, Maier & Neustadt, L.L.P.

(57) ABSTRACT

The vehicle controller controls a vehicle. The vehicle includes a transmission and an internal combustion engine that has a variable valve actuation device. The vehicle controller includes an execution device. The execution device executes first and second gear ratio adjustment processes and first and second intake VVT adjustment processes. The first intake VVT adjustment process includes adjusting the intake valve timing such that the internal combustion engine is operated in an Atkinson cycle. The second intake VVT adjustment process includes setting the intake valve timing such that the closing timing of the intake valve is more advanced than in a case in which the first intake VVT adjustment process is executed.

7 Claims, 4 Drawing Sheets

VEHICLE CONTROLLER AND METHOD FOR VEHICLE CONTROL METHOD

BACKGROUND

1. Field

The present disclosure relates to a vehicle controller and a vehicle control method employed in a vehicle including an internal combustion engine and a transmission.

2. Description of Related Art

Japanese Laid-Open Patent Publication No. 2016-114042 discloses a variable valve actuation device that varies an intake valve timing that is an opening-closing timing of the intake valve. When the engine is operated with a low load, the internal combustion engine is operated in the Atkinson cycle by retarding the intake valve timing. In a case in which the internal combustion engine is operated in the Atkinson cycle, the intake valve remains open after the pistons each start moving toward the top dead center to compress the air drawn into the cylinders. Thus, some of the air drawn into the cylinders is pushed back to the intake passage. This reduces the pumping loss and the fuel consumption of the internal combustion engine.

For example, when the accelerator pedal operation amount is decreased in a situation in which the vehicle is traveling on a winding road or traveling on an uphill or downhill road, it is desired that the acceleration of the vehicle be decreased in correspondence with the decrease in the accelerator pedal operation amount. However, when the internal combustion engine is operated in the Atkinson cycle by retarding the intake valve timing as described above, some of the air drawn into the cylinders is pushed back to the intake passage. Thus, the decrease in the amount of air in the intake passage is delayed. This delays a decrease in the output torque of the internal combustion engine that occurs when the accelerator pedal operation amount is decreased. Accordingly, the decrease in the acceleration of the vehicle with respect to the decrease in the accelerator pedal operation amount may be delayed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides a vehicle controller. The vehicle controller is configured to control a vehicle including an internal combustion engine and a transmission. The internal combustion engine includes a cylinder, an intake passage through which air drawn into the cylinder flows, an intake valve that selectively opens and closes the intake passage, and a variable valve actuation device that varies an intake valve timing that is an opening-closing timing of the intake valve. The transmission receives an output torque of the internal combustion engine. The vehicle controller includes an execution device configured to control the internal combustion engine and the transmission. The execution device is configured to execute first and second gear ratio adjustment processes and first and second intake VVT adjustment processes. The first gear ratio adjustment process includes adjusting a gear ratio of the transmission. The second gear ratio adjustment process includes adjusting the gear ratio of the transmission such that a response delay of a change in an acceleration of the vehicle with respect to a change in an accelerator pedal operation amount is smaller than in a case in which the gear ratio of the transmission is adjusted by the first gear ratio adjustment process. The first intake VVT adjustment process includes adjusting, when the gear ratio of the transmission is adjusted by the first gear ratio adjustment process in a situation in which the internal combustion engine is operating in a predetermined operating region, the intake valve timing such that the internal combustion engine is operated in an Atkinson cycle. The second intake VVT adjustment process includes adjusting, when the gear ratio of the transmission is adjusted by the second gear ratio adjustment process in the situation in which the internal combustion engine is operating in the predetermined operating region, the intake valve timing such that a closing timing of the intake valve is more advanced than in a case in which the first intake VVT adjustment process is executed.

In the vehicle controller, when the gear ratio of the transmission is adjusted by the first gear ratio adjustment process in the situation in which the internal combustion engine is operating in the predetermined operating region, the internal combustion engine is operated in the Atkinson cycle. This causes some of the air drawn from the intake passage into the cylinder to be pushed back to the intake passage. When the gear ratio of the transmission is adjusted by the second gear ratio adjustment process in the situation in which the internal combustion engine is operating in the predetermined operating region, the intake valve timing is set such that the closing timing of the intake valve is more advanced than when the gear ratio of the transmission is adjusted by the first gear ratio adjustment process. This reduces the amount of air pushed back from the inside of the cylinder to the intake passage. Thus, the amount of air in the intake passage is reduced at a relatively early time. As a result, the engine torque of the internal combustion engine is reduced at a relatively early time. That is, a delay in the decrease of the internal combustion engine in a case in which the accelerator pedal operation amount is decreased is less likely to occur. This limits the occurrence of delay in the decrease of the acceleration of the vehicle with respect to the decrease in the accelerator pedal operation amount.

In an example of the vehicle controller, the execution device sets the intake valve timing such that the internal combustion engine is operated in an Otto cycle in the second intake VVT adjustment process.

In the vehicle controller, when the second intake VVT adjustment process is executed, the internal combustion engine is operated in the Otto cycle by a change in the intake valve timing. In this case, the intake valve is already closed at the start of the compression of air drawn into the cylinder. Thus, the air is not pushed back to the intake passage during the compression stroke. This reduces the amount of air in the intake passage at a relatively early stage. Accordingly, the delay in the decrease of the output torque of the internal combustion engine when the accelerator pedal operation amount is decreased is further limited.

A target of the closing timing of the intake valve in a case in which the second intake VVT adjustment process is executed in the situation in which the internal combustion engine is operating in the predetermined operating region is referred to as a specified closing timing. In this case, in an example of the vehicle controller, when changing a process that adjusts the gear ratio of the transmission from the first gear ratio adjustment process to the second gear ratio adjustment process, the execution device is configured to execute a third intake VVT adjustment process that varies the intake valve timing such that the closing timing of the intake valve becomes gradually advanced toward the specified closing timing and executes the second intake VVT adjustment process when the closing timing of the intake valve reaches the specified closing timing.

In the vehicle controller, when the process that adjusts the gear ratio of the transmission is changed from the first gear ratio adjustment process to the second gear ratio adjustment process, the third intake VVT adjustment process is executed and then the second intake VVT adjustment process is executed. This limits a sudden change in the valve closing timing of the intake valve. As a result, a sudden change in the output torque of the internal combustion engine that results from the advancement of the closing timing of the intake valve is limited.

In the vehicle controller, the execution device sets the specified closing timing to the closing timing of the intake valve during idling of the internal combustion engine.

Another aspect of the present disclosure provides a method for controlling a vehicle including an internal combustion engine and a transmission. The internal combustion engine includes a cylinder, an intake passage through which air drawn into the cylinder flows, an intake valve configured to selectively open and close the intake passage, and a variable valve actuation device that varies an intake valve timing that is an opening-closing timing of the intake valve. The transmission receives an output torque of the internal combustion engine. The method includes executing a first gear ratio adjustment process that adjusts a gear ratio of the transmission, executing a second gear ratio adjustment process that adjusts the gear ratio of the transmission such that a response delay of a change in an acceleration of the vehicle with respect to a change in an accelerator pedal operation amount is smaller than in a case in which the gear ratio of the transmission is adjusted by the first gear ratio adjustment process, executing a first intake VVT adjustment process that adjusts, when the gear ratio of the transmission is adjusted by the first gear ratio adjustment process in a situation in which the internal combustion engine is operating in a predetermined operating region, the intake valve timing such that the internal combustion engine is operated in an Atkinson cycle, and executing a second intake VVT adjustment process that adjusts, when the gear ratio of the transmission is adjusted by the second gear ratio adjustment process in the situation in which the internal combustion engine is operating in the predetermined operating region, the intake valve timing such that a closing timing of the intake valve is more advanced than in a case in which the first intake VVT adjustment process is executed.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A vehicle controller according to an embodiment will now be described with reference to FIGS. 1 to 3.

Figure 1:
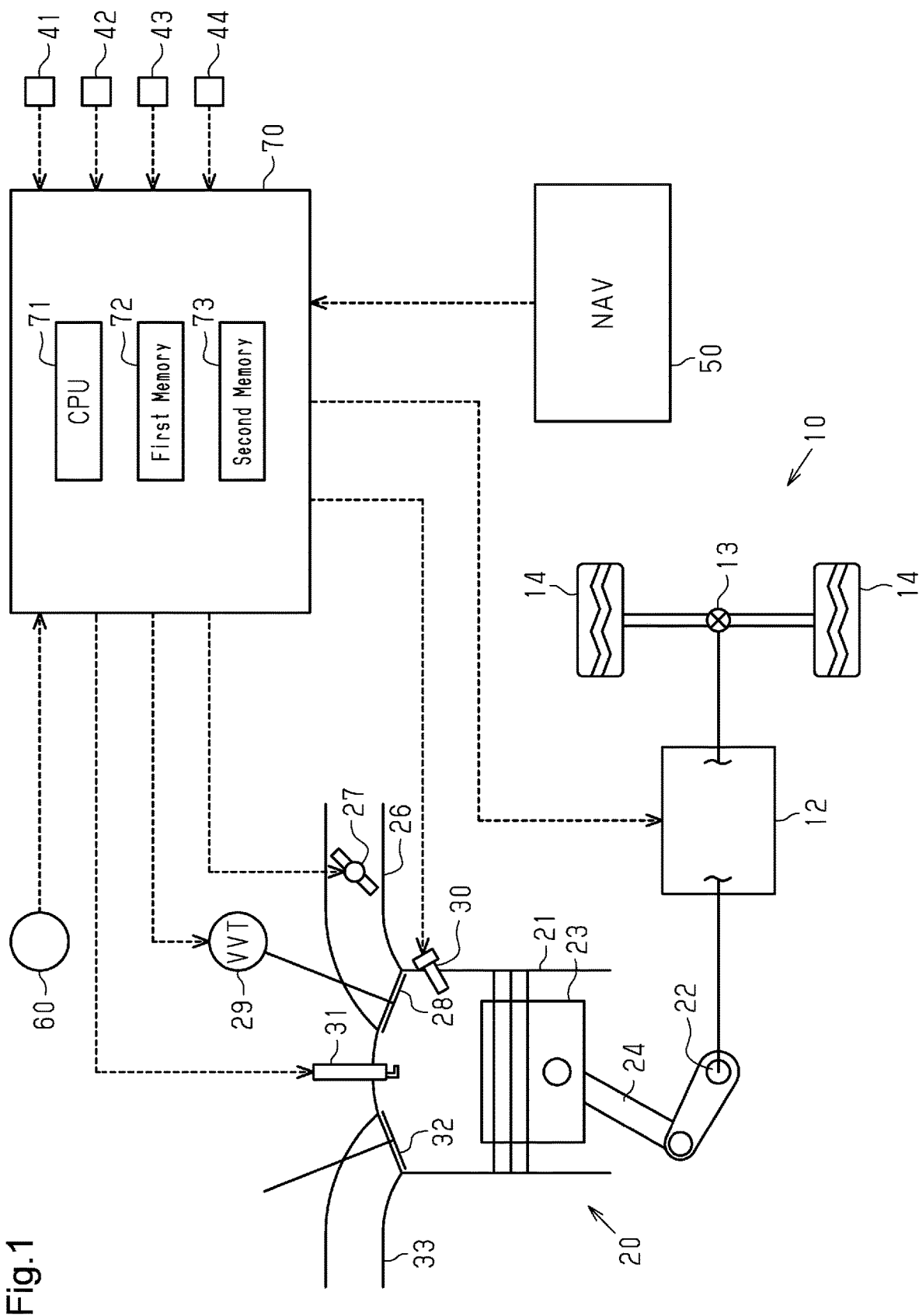
FIG. 1 is a diagram schematically showing a vehicle in which a vehicle controller according to an embodiment is employed.

FIG. 1 shows a vehicle 10 in which the controller 70 (vehicle controller) is employed. The vehicle 10 includes an internal combustion engine 20, a transmission 12, a differential 13, driven wheels 14, and a controller 70. The controller 70 corresponds to a vehicle controller. When the output torque of the internal combustion engine 20 is referred to as engine torque, the engine torque is transmitted to the driven wheels 14 through the transmission 12 and the differential 13.

Internal Combustion Engine

The internal combustion engine 20 includes cylinders 21 and a crankshaft 22. FIG. 1 shows only one of the cylinders 21. The cylinders 21 each accommodate a piston 23 such that the piston 23 can reciprocate. Connecting rods 24 respectively couple the pistons 23 to the crankshaft 22, respectively. Thus, each piston 23 reciprocates in a corresponding cylinder 21, thereby rotating the crankshaft 22.

The internal combustion engine 20 includes an intake passage 26, a throttle valve 27, intake valves 28, and a variable valve actuation device 29. The intake passage 26 is a passage through which air drawn into the cylinders 21 flows. The throttle valve 27 is located in the intake passage 26. The controller 70 adjusts a throttle open degree, which is the open degree of the throttle valve 27. The amount of air flowing through the intake passage 26 is adjusted by adjusting the throttle open degree. When an intake valve 28 is opened, air is drawn from the intake passage 26 into the cylinder 21 corresponding to the opened intake valve 28. When the opening-closing timing of the intake valve 28 is referred to as an intake valve timing, the variable valve actuation device 29 is configured to adjust the intake valve timing. For example, the variable valve actuation device 29 varies the intake valve timing in a state in which the interval between the opening timing and the closing timing of the intake valve 28 is fixed. The variable valve actuation device 29 adjusts the intake valve timing by controlling the controller 70. The intake valve timing will be hereinafter referred to as an intake VVT.

The internal combustion engine 20 includes fuel injection valves 30, ignition devices 31, exhaust valves 32, and an exhaust passage 33. The cylinders 21 respectively include the fuel injection valves 30, the ignition devices 31, and the exhaust valves 32. The fuel injection valves 30 inject fuel that is drawn into a corresponding cylinder 21. In each cylinder 21, air-fuel mixture containing air and fuel is burned by spark discharge of an ignition device 31. A fuel injection amount of the fuel injection valve 30 and a discharge timing of the ignition device 31 are adjusted by the controller 70. In each cylinder 21, the power from combustion of the air-fuel mixture causes a corresponding piston 23 to reciprocate. In the cylinders 21, exhaust gas is generated from the combustion of the air-fuel mixture. When each exhaust valve 32 is opened, the exhaust gas is discharged from a corresponding cylinder 21 to the exhaust passage 33.

Figure 2:
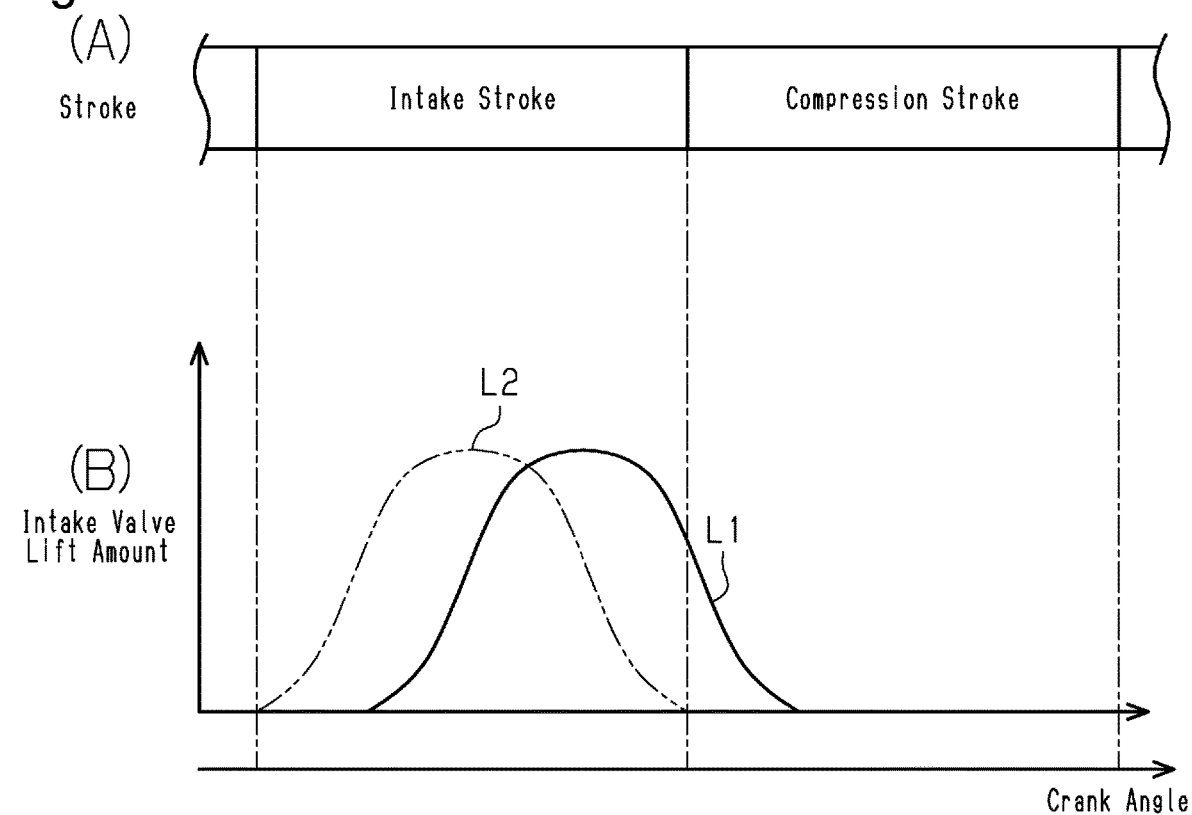
FIG. 2 is a diagram showing the intake valve timing during execution of the first VVT adjustment process and the intake valve timing during execution of the second VVT adjustment process.

As shown in FIG. 2, the adjustment of the intake VVT allows the internal combustion engine 20 to operate in the Otto cycle and in the Atkinson cycle.

When the internal combustion engine 20 is operating in the Atkinson cycle, the intake valve 28 is open as indicated by the solid line L1 in section (B) of FIG. 2 even if the compression stroke is started as shown in section (A) of FIG. 2 (i.e., even if the pistons 23 each start to rise toward the compression top dead center). Thus, some of the air drawn into the cylinders 21 is pushed back to the intake passage 26. This reduces the pumping loss and the fuel consumption of the internal combustion engine 20.

When the internal combustion engine 20 is operating in the Otto cycle, the intake valves 28 are closed at the start of the compression stroke as indicated by the long dashed double-short dashed line L2 in section (B) of FIG. 2. Thus, the air drawn into the cylinder 21 is not pushed back to the intake passage 26 during the compression stroke.

Detection System

As shown in FIG. 1, the detection system outputs a signal corresponding to the detection result to the controller 70. The detection system includes a crank angle sensor 41, an air flow meter 42, an accelerator pedal depression amount sensor 43, and a vehicle speed sensor 44. The crank angle sensor 41 detects a crank angle, which is the rotation angle of the crankshaft 22. The air flow meter 42 detects an intake air amount, which is the amount of air flowing through the intake passage 26. The accelerator pedal depression amount sensor 43 detects the depression amount of the accelerator pedal. The vehicle speed sensor 44 detects a vehicle speed, which is the travel speed of the vehicle 10. The rotation speed of the crankshaft 22 based on a detection value of the crank angle sensor 41 is referred to as an engine rotation speed NE. The intake air amount based on the detection value of the air flow meter 42 is referred to as an intake air amount GA. The accelerator pedal depression amount based on the detection value of the accelerator pedal depression amount sensor 43 is referred to as an accelerator pedal depression amount AC. The accelerator pedal depression amount AC corresponds to an accelerator pedal operation amount. The vehicle speed based on the detection value of the vehicle speed sensor 44 is referred to as a vehicle speed SP.

The detection system includes a navigation device 50. The navigation device 50 sends information related to a road on which the vehicle 10 is traveling, information related to the position of vehicle 10, information related to a recommended travel route of the vehicle 10 to a destination, and the like to controller 70. The information related to the road on which the vehicle 10 is traveling includes the curvature of the road, the gradient of the road, whether there is an intersection, and the like. This allows the controller 70 to obtain, for example, the following information (A1), (A2), and (A3).

(A1) The travel distance from the current position of the vehicle 10 to the start position of a winding road that is located ahead of the vehicle 10

(A2) The travel distance from the current position of the vehicle 10 to the start position of a hill road that is located ahead of the vehicle 10

(A3) The travel distance from the current position of the vehicle 10 to an intersection located ahead of the vehicle 10 in a case in which the vehicle 10 may turn right or left at the intersection The vehicle 10 includes an operation unit 60 that is operated to change the travel mode of the vehicle 10. When an occupant of the vehicle 10 operates the operation unit 60, the operation unit 60 outputs, to the controller 70, a signal indicating that a change in the travel mode is requested. Examples of the travel mode of the vehicle 10 include a normal mode and a responsivity improving mode. The responsivity improving mode is a travel mode in which the response delay of a change in the acceleration of the vehicle 10 with respect to a change in the accelerator pedal depression amount AC is smaller than in the normal mode.

Controller

As shown in FIG. 1, the controller 70 includes a CPU 71, a first memory 72, and a second memory 73. The CPU 71 corresponds to an execution device. The first memory 72 stores a control program that is executed by the CPU 71. The second memory 73 temporarily stores, for example, calculation results of the CPU 71. The CPU 71 may be processing circuitry configured to execute the control program.

By executing the control program, the CPU 71 controls the transmission 12 and the operation of the internal combustion engine 20 based on the detection values of various sensors, the information sent from the navigation device 50, and the signal sent from the operation part.

Figure 3:
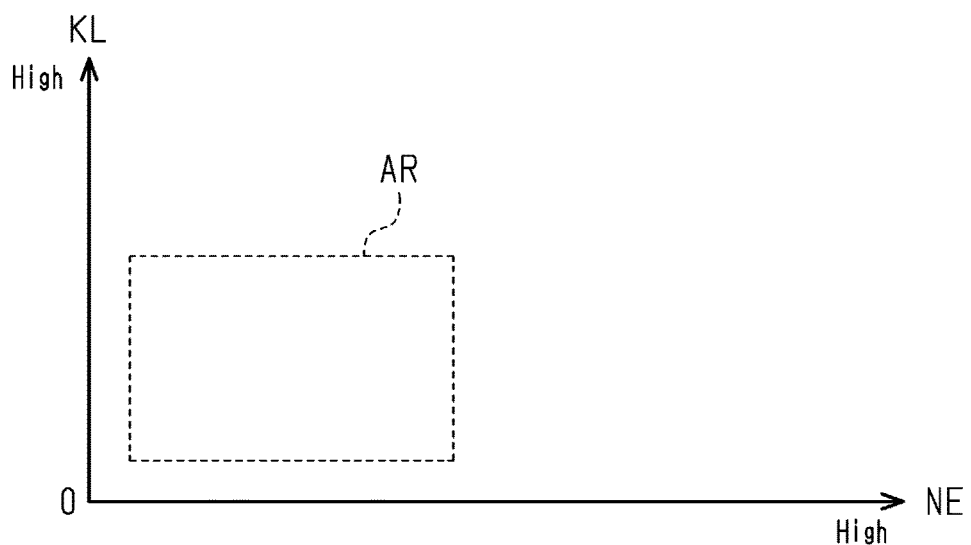
FIG. 3 is a graph showing an operating region of the internal combustion engine.

As shown in FIG. 3, the CPU 71 determines whether to operate the internal combustion engine 20 in the Atkinson or Otto cycle depending on an operating region of the internal combustion engine 20. The operating region is indicated by the engine rotation speed NE and an engine load factor KL. The engine load factor KL can be calculated from the engine rotation speed NE and the intake air amount GA. The engine load factor KL is an index value of the air filling factor in each cylinder 21. Specifically, the engine load factor KL is the ratio of an inflow air amount per combustion cycle of one cylinder to a reference inflow air amount. The reference inflow air amount changes in correspondence with the engine rotation speed NE.

When the operating state of the internal combustion engine 20 indicated by the current engine rotation speed NE and the current engine load factor KL is included in a predetermined operating region AR, the CPU 71 causes the internal combustion engine 20 to operate in the Atkinson cycle. When the operating state of the internal combustion engine 20 is not included in the predetermined operating region AR, the CPU 71 causes the internal combustion engine 20 to operate in the Otto cycle.

Control of Transmission

Figure 4:
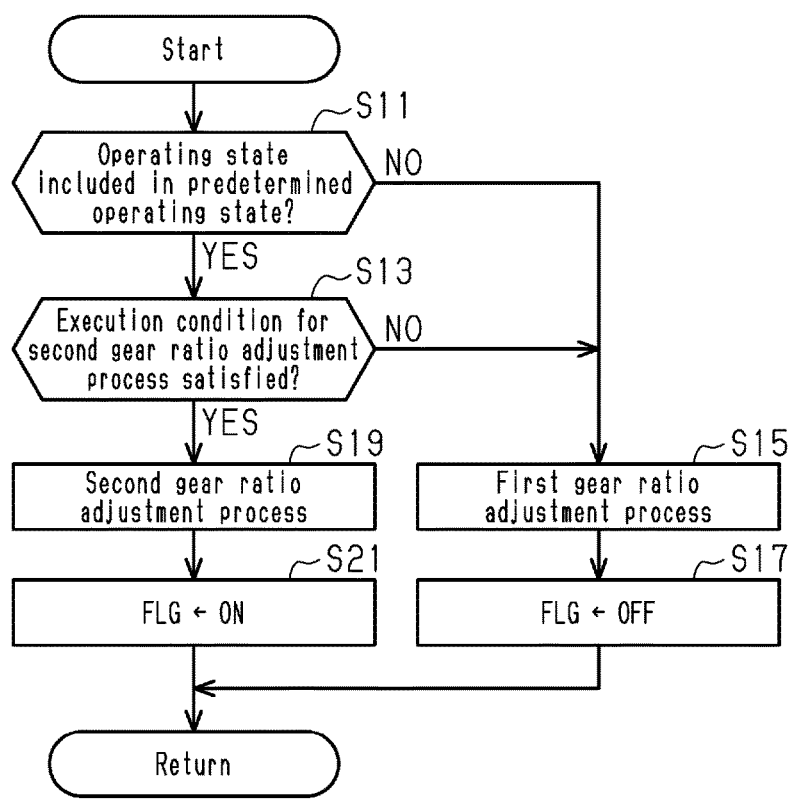
FIG. 4 is a flowchart illustrating a processing routine executed by the vehicle controller.

The control of the transmission 12 with the responsivity improving mode selected as the travel mode will now be described with reference to FIG. 4. FIG. 4 illustrates a processing routine of the control. When the responsivity improving mode is selected, the CPU 71 executes the control program to repeatedly execute the processing routine in a predetermined control cycle.

In the processing routine, the CPU 71 determines in step S11 whether the operating state of the internal combustion engine 20 is included in the predetermined operating region AR. When the operating state of the internal combustion engine 20 is included in the operating region AR, the internal combustion engine 20 is operated in the Atkinson cycle. That is, the determination process in step S11 is a process that determines whether the operating state of the internal combustion engine 20 is an operating state in which the internal combustion engine 20 is operated in the Atkinson cycle. When the operating state of the internal combustion engine 20 is included in the predetermined operating region (S11: YES), the CPU 71 advances the process to step S13. When the operating state of the internal combustion engine 20 is not included in the predetermined operating region (S11: NO), the CPU 71 advances the process to step S15.

In step S13, the CPU 71 determines whether the condition for executing a second gear ratio adjustment process is satisfied.

A process that adjusts the gear ratio of the transmission 12 will now be described. In the present embodiment, the process that adjusts the gear ratio includes a first gear ratio adjustment process and the second gear ratio adjustment process.

The first gear ratio adjustment process is executed when the normal mode is selected as the travel mode. The first gear ratio adjustment process is also executed when the responsivity improving mode is selected as the travel mode or when the condition for executing the second gear ratio adjustment process is not satisfied.

The second gear ratio adjustment process is executed when the condition for executing the second gear ratio adjustment process is satisfied with the responsivity improving mode selected as the travel mode. The second gear ratio adjustment process is a process that adjusts the gear ratio of the transmission 12 such that the response delay of a change in the vehicle 10 with respect to a change in the accelerator pedal depression amount AC is smaller than in a case in which the gear ratio of the transmission 12 is adjusted by the first gear ratio adjustment process. For example, the second gear ratio adjustment process restricts the gear ratio of the transmission 12 from being changed to be higher or sets the gear ratio of the transmission 12 to be lower than when the first gear ratio adjustment process is executed, thereby reducing the response delay of the change in the acceleration with respect to the change in the accelerator pedal depression amount AC.

When any one of the following conditions (B1), (B2), (B3), and (B4) is satisfied, the CPU 71 determines that the condition for executing the second gear ratio adjustment process is satisfied.

(B1) When Vehicle 10 Travels on Winding Road

When the vehicle 10 is traveling on a winding road, the driver of the vehicle 10 wants to adjust the acceleration and deceleration of the vehicle 10 by adjusting the accelerator pedal depression amount AC. Thus, when the accelerator pedal depression amount AC is decreased, an acceleration GX of the vehicle 10 may start to be decreased immediately. That is, when the accelerator pedal depression amount AC is decreased, the vehicle 10 may start to be decelerated immediately. Thus, when the vehicle 10 is traveling on a winding road or when the CPU 71 recognizes that the vehicle 10 is traveling ahead of the winding road based on the information received from the navigation device 50, the CPU 71 determines that the execution condition is satisfied.

(B2) When Vehicle 10 Travels on Hill Road

When the gear position of the transmission 12 is set to be relatively high in a case in which the vehicle 10 is traveling on an uphill road, the vehicle 10 is less likely to be accelerated by an increase in the accelerator pedal depression amount AC. When the gear position of the transmission 12 is set to be relatively high in a case in which the vehicle 10 is traveling on a downhill road, engine braking is less likely to act on the vehicle 10. To solve this problem, when the vehicle 10 is traveling on a hill road or when the CPU 71 recognizes that the vehicle 10 is traveling ahead of the hill road based on the information received from the navigation device 50, the CPU 71 determines that the execution condition is satisfied.

(B3) When Vehicle 10 Turns Right or Left at Intersection

In such a case, the driver operates the brake pedal to decelerate the vehicle 10 and operates the steering wheel to turn the vehicle 10. Then, the driver operates the accelerator pedal to accelerate the vehicle 10. In order to increase the acceleration performance of the vehicle 10, the gear position of the transmission 12 needs to be prevented from being changed to be higher. Thus, when the vehicle 10 is traveling ahead of an intersection where the vehicle 10 will turn right or left, or when the CPU 71 recognizes that the vehicle 10 is traveling at the intersection, the CPU 71 determines that the execution condition is satisfied.

(B4) When Vehicle 10 is Suddenly Decelerated by Sudden Braking

After suddenly decelerating the vehicle 10 in this manner, the driver may increase the accelerator pedal depression amount AC in order to accelerate the vehicle 10 again. If the gear position of the transmission 12 is set to be relatively high, the vehicle 10 is less likely to be accelerated. Thus, when the vehicle 10 is suddenly decelerated by sudden braking, the CPU 71 determines that the execution condition is satisfied.

When determining that the condition for executing the second gear ratio adjustment process is satisfied (S13: YES), the CPU 71 advances the process to step S19. When determining that the execution condition is not satisfied (S13: NO), the CPU 71 advances the process to step S15.

In step S15, the CPU 71 executes the first gear ratio adjustment process. In the next step S17, the CPU 71 sets an operating flag FLG to OFF. The operating flag FLG is used to determine whether the second gear ratio adjustment process is being executed. Then, the CPU 71 temporarily ends the processing routine.

In step S19, the CPU 71 executes the second gear ratio adjustment process. For example, in the case of the above condition (B1), the CPU 71 sets the gear position of the transmission 12 to be lower in the second gear ratio adjustment process than when the first gear ratio adjustment process is executed. For example, in the case of the above condition (B2) or (B3), the CPU 71 sets the gear position of the transmission 12 to be lower in the second gear ratio adjustment process than when the first gear ratio adjustment process is executed, or prohibits the gear position of the transmission 12 from being changed to be higher even if the accelerator pedal depression amount AC is increased. For example, in the case of the above condition (B4), the CPU 71 sets the gear position of the transmission 12 to be lower during the deceleration of the vehicle 10 due to sudden braking.

In the next step S21, the CPU 71 sets the operating flag FLG to ON Then, the CPU 71 temporarily ends the processing routine.

Control of Intake VVT

Figure 5:
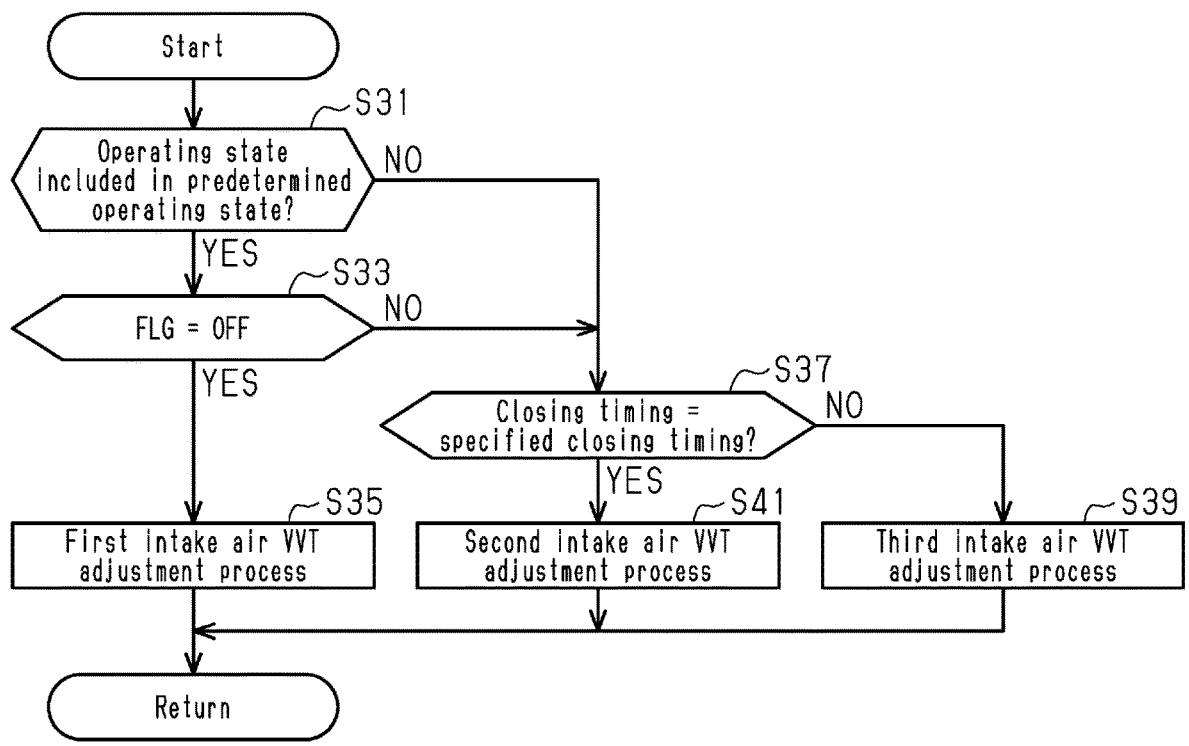
FIG. 5 is a flowchart illustrating a processing routine executed by the vehicle controller.

The control of the intake VVT will now be described with reference to FIG. 5. FIG. 5 illustrates a processing routine of the control. The CPU 71 executes the control program to repeatedly execute the processing routine in a predetermined control cycle.

In the processing routine, the CPU 71 determines in step S31 whether the operating state of the internal combustion engine 20 is included in the predetermined operating region AR. When the operating state of the internal combustion engine 20 is included in the predetermined operating region (S31: YES), the CPU 71 advances the process to step S33. When the operating state of the internal combustion engine 20 is not included in the predetermined operating region (S31: NO), the CPU 71 advances the process to step S37.

In step S33, the CPU 71 determines whether the operating flag FLG is set to OFF. When the operating flag FLG is set to OFF (S33: YES), the CPU 71 advances the process to step S35. When the operating flag FLG is set to ON (S33: NO), the CPU 71 advances the process to step S37.

In step S35, the CPU 71 executes a first intake VVT adjustment process that adjusts the intake VVT such that the internal combustion engine 20 is operated in the Atkinson cycle. Specifically, the CPU 71 controls the variable valve actuation device 29 to adjust the intake VVT such that the intake valve 28 closes during the compression stroke. Then, the CPU 71 temporarily ends the processing routine.

In step S37, the CPU 71 determines whether the closing timing of the intake valve 28 is a specified closing timing. The specified closing timing is set to the closing timing of the intake valve 28 when the internal combustion engine 20 can be operated in the Otto cycle. For example, the CPU 71 may set the specified closing timing to the closing timing of the intake valve 28 in the case of idling of the internal combustion engine 20. When the closing timing of the intake valve 28 is the specified closing timing (S37: YES), the CPU 71 advances the process to step S41. When the closing timing is not the specified closing timing (S37: NO), the CPU 71 advances the process to step S39.

In step S39, the CPU 71 executes a third intake VVT adjustment process that varies the intake VVT such that the closing timing of the intake valve 28 is gradually advanced toward the specified closing timing by controlling the variable valve actuation device 29. The point in time immediately after the operating flag FLG is set to ON is the point in time immediately after the process that adjusts the gear ratio of the transmission 12 is changed from the first gear ratio adjustment process to the second gear ratio adjustment process. Thus, the closing timing of the intake valve 28 is more retarded from the specified closing timing. Thus, the CPU 71 executes the third intake VVT adjustment process in order to limit a sudden change in the engine torque that results from a sudden change in the closing timing of the intake valve 28. Then, the CPU 71 temporarily ends the processing routine.

In step S41, the CPU 71 executes the second intake VVT adjustment process, which sets the intake VVT such that the closing timing of the intake valve 28 is more advanced than when the gear ratio of the transmission 12 is adjusted by the first intake VVT adjustment process. For example, in the second intake VVT adjustment process, the CPU 71 sets the intake VVT such that the internal combustion engine 20 is operated in the Otto cycle. In this case, the CPU 71 controls the variable valve actuation device 29 to adjust the intake VVT such that the intake valve 28 is already closed at the start of the compression stroke. Then, the CPU 71 temporarily ends the processing routine.

Operation of Present Embodiment

Figure 6:
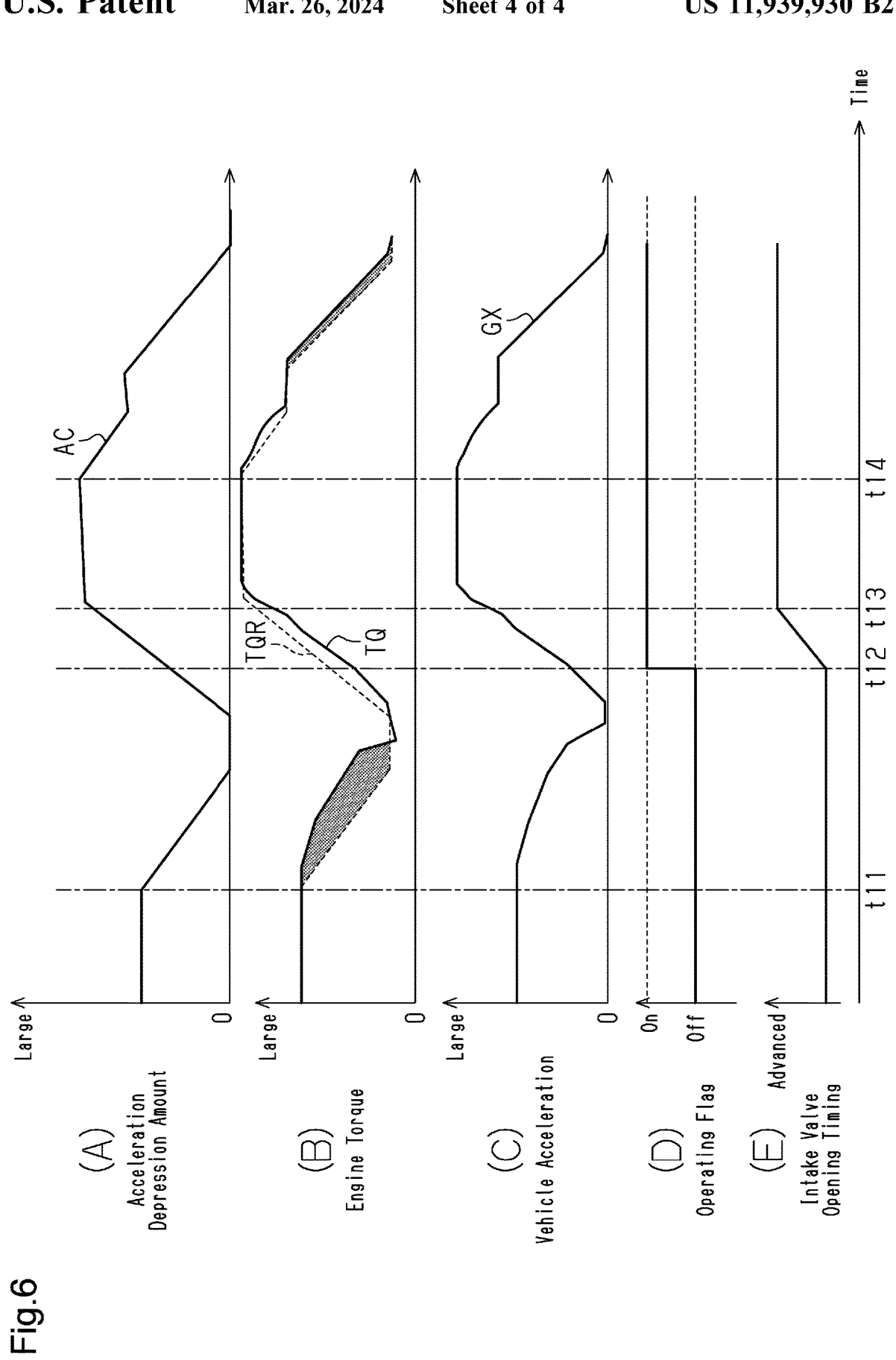
FIG. 6 is a timing diagram illustrating the operation of the vehicle controller.

The operation of the case in which the responsivity improving mode is set as the travel mode when the operating state of the internal combustion engine 20 is included in the predetermined operating region AR will now be described with reference to FIG. 6. Section (A) of FIG. 6 shows changes in the accelerator pedal depression amount AC. In section (B) of FIG. 6, the broken line shows changes in a request value TQR of the engine torque in a case in which the accelerator pedal depression amount AC changes as shown in section (A) of FIG. 6, and the solid line shows changes in an engine torque TQ. Section (C) of FIG. 6 shows changes in the acceleration GX of the vehicle 10. Section (D) of FIG. 6 shows changes in the state of ON or OFF of the operating flag FLG. Section (E) of FIG. 6 shows changes in the closing timing of the intake valve 28.

At time t11, when the accelerator pedal is being operated, the accelerator pedal depression amount AC starts to decrease. Then, as shown in section (B) of FIG. 6, the request value TQR of the engine torque gradually decreases as the accelerator pedal depression amount AC decreases. Before time t12, the operating flag FLG is set to OFF as shown in section (D) of FIG. 6. Thus, the first VVT adjustment process is executed as the process that adjusts the intake VVT. Thus, the internal combustion engine 20 is operated in the Atkinson cycle.

When the internal combustion engine 20 is operating in the Atkinson cycle, the amount of air in the intake passage 26 is less likely to decrease as described above. Consequently, as shown in section (B) of FIG. 6, the decrease in the engine torque TQ is delayed with respect to the decrease in the request value TQR of the engine torque. Thus, as shown in section (C) of FIG. 6, the decrease in the acceleration GX is delayed.

At the subsequent time t12, it is determined that the condition for executing the second gear ratio adjustment process is satisfied. For example, the vehicle 10 is about to enter a winding road. Then, the operating flag FLG is set to ON. This causes the process that adjusts the intake VVT to change from the first VVT adjustment process to the third intake VVT adjustment process.

When the third intake VVT adjustment process is executed, as shown in section (E) of FIG. 6, the closing timing of the intake valve 28 is gradually advanced toward the specified closing timing. The advancement of the closing timing of the intake valve 28 causes the internal combustion engine 20 to be operated in the Otto cycle. When the closing timing reaches the specified closing timing at time t13, the process that adjusts the intake VVT changes from the third intake VVT adjustment process to the second VVT adjustment process.

When the second VVT adjustment process is executed, the state in which the internal combustion engine 20 is operated in the Otto cycle is maintained. In this case, the amount of air in the intake passage 26 is decreased at an earlier time than in the case in which the engine 20 is operated in the Atkinson cycle. Thus, when the request value TQR of the engine torque decreases in correspondence with a decrease in the accelerator pedal depression amount AC subsequent to time t14, the engine torque TQ decreases immediately. As a result, the acceleration GX of the vehicle 10 is reduced at a relatively early time.

Advantages of Present Embodiment (1) In the present embodiment, when the gear ratio of the transmission 12 is adjusted by the second gear ratio adjustment process in a situation in which the internal combustion engine 20 is operating in the predetermined operating region AR, the second VVT adjustment process is executed. Thus, the closing timing of the intake valve 28 is more advanced than in the case in which the first VVT adjustment process is executed. This reduces the amount of air pushed back from the inside of the cylinder 21 to the intake passage 26. Thus, the amount of air in the intake passage 26 is reduced at a relatively early time. As a result, the engine torque TQ is reduced at a relatively early time. That is, a delay in the decrease of the engine torque TQ in a case in which the accelerator pedal depression amount AC is decreased is less likely to occur. This limits the occurrence of delay in the decrease of the acceleration GX of the vehicle 10 with respect to the decrease in the accelerator pedal depression amount AC. Additionally, when the operation of the accelerator pedal is canceled, the vehicle 10 is decelerated at a relatively early time.

(2) When the second intake VVT adjustment process is executed, the internal combustion engine 20 is operated in the Otto cycle. Thus, the amount of air in the intake passage 26 is reduced at a relatively early time. Thus, the delay in the decrease of the engine torque TQ when the accelerator pedal depression amount AC is decreased is further limited.

(3) When the second gear ratio adjustment process is started, the process that adjusts the intake VVT is changed from the first VVT adjustment process to the third intake VVT adjustment process. When the closing timing of the intake valve 28 is advanced to the specified closing timing by the third intake VVT adjustment process, the second VVT adjustment process is executed. This limits a sudden change in the closing timing of the intake valve 28. As a result, a sudden change in the engine torque TQ that results from the advancement of the closing timing is limited.

Modifications

The above embodiment may be modified as follows. The above embodiment and the following modifications can be combined as long as the combined modifications remain technically consistent with each other.

If the execution of the internal combustion engine 20 allows the internal combustion engine 20 to be operated in the Otto cycle, the specified closing timing may be set to be different from the closing timing of the intake valve 28 during idling of the internal combustion engine 20.

When the first gear ratio adjustment process is changed to the second gear ratio adjustment process, the process that adjusts the intake VVT may be changed from the first VVT adjustment process to a second intake VVT process. That is, the third intake VVT adjustment process does not have to be executed when the first gear ratio adjustment process is changed to the second gear ratio adjustment process.

If the execution of the second VVT adjustment process allows the closing timing of the intake valve 28 to be more advanced than when the first VVT adjustment process is executed, the internal combustion engine 20 may be operated in the Atkinson cycle.

The controller 70 is not limited to a device that includes a CPU and a memory and executes software processing. That is, the controller 70 may be modified as long as it has any one of the following configurations (a) to (c):

(a) The controller 70 includes one or more processors that execute various processes in accordance with a computer program. The processor includes a CPU and a memory, such as a RAM and ROM. The memory stores program codes or instructions configured to cause the CPU to execute the processes. The memory, or a computer-readable medium, includes any type of medium that is accessible by general-purpose computers and dedicated computers.

(b) The controller 70 includes one or more dedicated hardware circuits that execute various processes. Examples of the dedicated hardware circuits include an application specific integrated circuit (ASIC) and a field programmable gate array (FPGA).

(c) The controller 70 includes a processor that executes part of various processes in accordance with a computer program and a dedicated hardware circuit that executes the remaining processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle controller configured to control a vehicle including an internal combustion engine and a transmission, wherein the internal combustion engine includes:
a cylinder;
an intake passage through which air drawn into the cylinder flows;
an intake valve that selectively opens and closes the intake passage; and
a variable valve actuation device that varies an intake valve timing that is an opening-closing timing of the intake valve,
the transmission receives an output torque of the internal combustion engine,
the vehicle controller comprises an execution device configured to control the internal combustion engine and the transmission, and
the execution device is configured to execute:
a first gear ratio adjustment process that adjusts a gear ratio of the transmission;
a second gear ratio adjustment process that adjusts the gear ratio of the transmission such that a response delay of a change in an acceleration of the vehicle with respect to a change in an accelerator pedal operation amount is smaller than in a case in which the gear ratio of the transmission is adjusted by the first gear ratio adjustment process;
a first intake VVT adjustment process that adjusts, when the gear ratio of the transmission is adjusted by the first gear ratio adjustment process in a situation in which the internal combustion engine is operating in a predetermined operating region, the intake valve timing such that the internal combustion engine is operated in an Atkinson cycle; and
a second intake VVT adjustment process that adjusts, when the gear ratio of the transmission is adjusted by the second gear ratio adjustment process in the situation in which the internal combustion engine is operating in the predetermined operating region, the intake valve timing such that a closing timing of the intake valve is more advanced than in a case in which the first intake VVT adjustment process is executed to limit occurrence of delay in a decrease of the acceleration of the vehicle with respect to a decrease in the accelerator pedal operation amount.

2. The vehicle controller according to claim 1, wherein the execution device is configured to set the intake valve timing such that the internal combustion engine is operated in an Otto cycle in the second intake VVT adjustment process.

3. The vehicle controller according to claim 1, wherein a target of the closing timing of the intake valve in a case in which the second intake VVT adjustment process is executed in the situation in which the internal combustion engine is operating in the predetermined operating region is referred to as a specified closing timing, and when changing a process that adjusts the gear ratio of the transmission from the first gear ratio adjustment process to the second gear ratio adjustment process, the execution device is configured to execute a third intake VVT adjustment process that varies the intake valve timing such that the closing timing of the intake valve becomes gradually advanced toward the specified closing timing and executes the second intake VVT adjustment process when the closing timing of the intake valve reaches the specified closing timing.

4. The vehicle controller according to claim 3, wherein the execution device is configured to set the specified closing timing to the closing timing of the intake valve during idling of the internal combustion engine.

5. A method for controlling a vehicle including an internal combustion engine and a transmission, wherein
the internal combustion engine includes:
  a cylinder;
  an intake passage through which air drawn into the cylinder flows;
  an intake valve that selectively opens and closes the intake passage; and
  a variable valve actuation device that varies an intake valve timing that is an opening-closing timing of the intake valve,
the transmission receives an output torque of the internal combustion engine, and
the method comprises:
  executing a first gear ratio adjustment process that adjusts a gear ratio of the transmission;
  executing a second gear ratio adjustment process that adjusts the gear ratio of the transmission such that a response delay of a change in an acceleration of the vehicle with respect to a change in an accelerator pedal operation amount is smaller than in a case in which the gear ratio of the transmission is adjusted by the first gear ratio adjustment process;
  executing a first intake VVT adjustment process that adjusts, when the gear ratio of the transmission is adjusted by the first gear ratio adjustment process in a situation in which the internal combustion engine is operating in a predetermined operating region, the intake valve timing such that the internal combustion engine is operated in an Atkinson cycle; and
  executing a second intake VVT adjustment process that adjusts, when the gear ratio of the transmission is adjusted by the second gear ratio adjustment process in the situation in which the internal combustion engine is operating in the predetermined operating region, the intake valve timing such that a closing timing of the intake valve is more advanced than in a case in which the first intake VVT adjustment process is executed to limit occurrence of delay in a decrease of the acceleration of the vehicle with respect to a decrease in the accelerator pedal operation amount.

6. The vehicle controller according to claim 1, wherein a condition for executing the second gear ratio adjustment process includes the vehicle traveling on a downhill road.

7. The method according to claim 5, wherein a condition for executing the second gear ratio adjustment process includes the vehicle traveling on a downhill road.

* * * * *